April 29, 1952 C. C. LAURITSEN 2,594,660
ROENTGEN METER
Filed Oct. 15, 1949
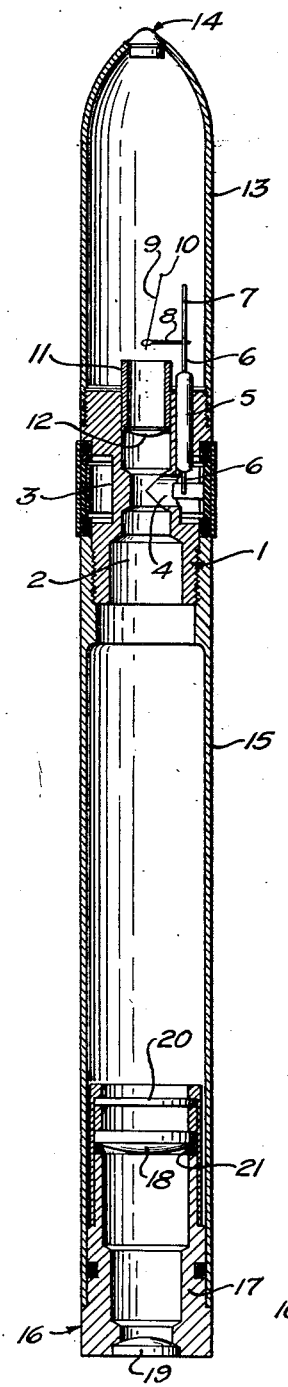
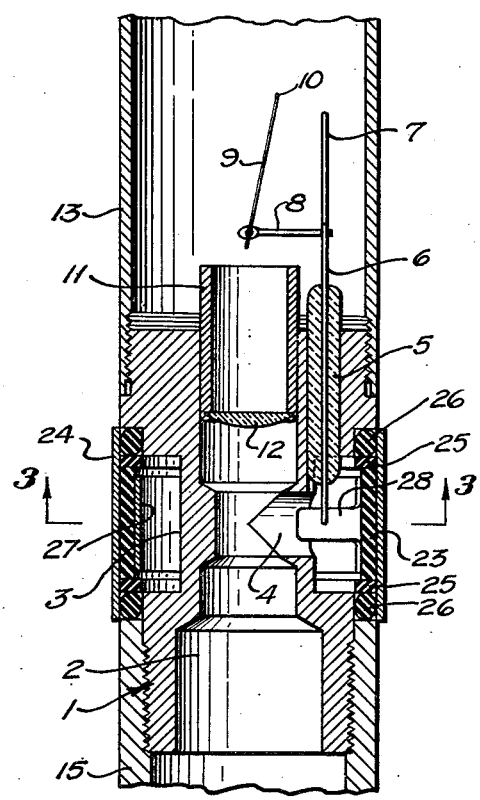
Fig. 2
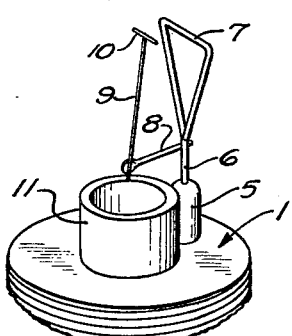
Fig. 4
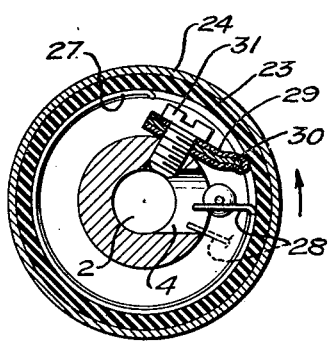
Fig. 3
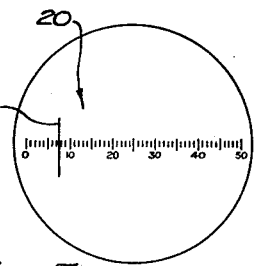
Fig. 5
Fig. 1
INVENTOR.
Charles C. Lauritsen.
By Lyon & Lyon
ATTORNEYS.

Patented Apr. 29, 1952

2,594,660

UNITED STATES PATENT OFFICE 2,594,660

ROENTGEN METER

Charles C. Lauritsen, Pasadena, Calif., assignor to California Institute Research Foundation, Pasadena, Calif., a corporation of California Application October 15, 1949, Serial No. 121,510

2 Claims. (Cl. 250—83.6)

My invention relates to Roentgen meters and included in the objects of my invention are:

First: to provide a Roentgen meter which is so constructed and arranged that it may be made extremely compact; in fact, may have the dimensions of an ordinary fountain pen so that it may be readily and conveniently carried upon the person of the user.

Second: to provide a Roentgen meter which incorporates an electroscope and a unique charging device which may at any time be readily and quickly operated to recharge the electroscope.

Third: to provide a Roentgen meter which, because of its small size and self-contained means for recharging, is particularly useful as a portable device for measuring or detecting radio-activity regardless of its source, and which is sufficiently economical to manufacture in quantity, and, in addition, is operable even by an inexperienced person that it may be mass produced for civilian use in the event of general danger of exposure to radioactivity.

Fourth: to provide a Roentgen meter of this class which is particularly dependable to permit its use quantitatively by technicians working in and around radioactive emanations whether from radioactive materials or apparatus.

With the above and other objects in view as may appear hereinafter, reference is directed to the accompanying drawings in which:

Figure 1 is an enlarged longitudinal sectional view of my Roentgen meter.

Figure 2 is a further enlarged fragmentary sectional view of the electroscope elements and charging means thereof.

Figure 3 is a transverse sectional view through 3—3 of Figure 1.

Figure 4 is a fragmentary perspective view showing the electroscope elements.

Figure 5 is an end view representing the image of the electroscope as it appears on the scale incorporated in the device.

My Roentgen meter includes a body member 1 having longitudinal bore 2 and a circumferential channel 3. The channel 3 communicates with the bore 2 through a side opening 4. Mounted in the walls of the body 1 and extending between the channel 3 and one end of the body is an insert 5 of insulating material.

Centered in the insert 5 is a rod 6, one end of which projects into the channel 3 and the other end of which projects axially beyond the body 1. The protruding end of the rod 6 constitutes the electrostatic element 7, and is preferably in the form of a triangular loop. Secured to the rod at the base of the electrostatic element 7 is a wire 8. The extremity of the wire carries a flexible fiber or filament 9 which terminates in a cross member 10 disposed in parallel relation with the triangular fixed electrostatic element 7. As will be brought out hereinafter the element 10 moves to and from the fixed element 7 and its position is capable of being measured on a scale.

Mounted in the bore 2 of the body 1 is a tube 11 which carries an objective lens 12. The end of the body provided with the electrostatic elements is externally threaded to receive an enclosing cap 13 which extends beyond the electrostatic element terminating in a constricted nose in which is mounted a transparent window 14. The cap 13 forms with the body 1 an ionization chamber.

The other extremity of the body is externally threaded to receive a tubular barrel 15, the extremity of which receives an eye piece 16. The eye piece includes a tubular body 17, in which are mounted lenses 18 and 19 as well as a scale 20 having a diametrically extending scale etched thereon. An O-ring 21 may be employed to seal the eye piece relative to the barrel 15.

My Roentgen meter utilizes self-contained charging or generating means. This means includes a generator ring 23 which surrounds the channel 3. The generator ring is formed of amber or certain plastics having high dielectric qualities. The ring is covered by a collar 24, and is flanked axially by insulating washers 25 and seal rings 26.

Frictionally mounted within the generator ring 23 is a collector member 27 in the form of a metal band occupying approximately three-fourths the inner periphery of the generator ring. The collector member 27 is provided with a radially, inwardly directed tongue 28 which is movable between a position engaging the rod 6 which projects into the channel 3 and a position engaging the side wall of the opening 4, as indicated by solid and dotted lines respectively in Figure 3.

Mounted within the channel 3 is a generator pad 29 formed of chamois, leather, or other friction material adapted when rubbed against a dielectric surface to generate a static charge. The generator pad is folded over a core lug 30 of metal. A screw 31 secures the generator pad in place so that it is extended and bears yieldably against the generator ring 23 between and clearing the extremities of the collector member 27.

Operation of my Roentgen meter is as follows:

Direct observation through the microscope unit 16 indicates the position of the movable cross element relative to the fixed element, this being accomplished by so arranging the lens system that the image of the cross member 10 is projected onto the scale 20. The electroscope (comprising electrostatic elements 6 to 10) is charged by rotating the generator or charging ring 23 in a counter clockwise direction as viewed in Figure 3, and indicated by the arrow. Several quick rotations of the generator ring will completely charge the electroscope. The ring is then turned clockwise moving the tongue 28 away from the rod 6 and preferably against the side wall of the opening 4. When it is desired to recharge the electroscope, it is merely necessary to rotate the generator ring in its counter clockwise direction.

It will be observed that the charging device does not appreciably alter the outside dimensions of the electroscope. It performs the very necessary function of recharging the Roentgen meter, this being accomplished without resort to any extraneous devices for this purpose.

Having thus described certain embodiments and applications of my invention, I do not desire to be limited, but intend to claim all novelty inherent in the appended claims.

I claim:

1. The combination with a Roentgen meter involving a body structure having an ion chamber and an electroscope having a charge receiving element, of an electrostatic charge generator involving: a rotatable band mounted on said body structure and having an outer manually engageable surface to effect rotation and an inner electrostatically chargeable surface; a wiper within said body structure engageable with the inner surface of said band for generating a charge thereon; and an arcuate strip frictionally engageable with said rotatable band and including a tongue movable by said band into and out of engagement with the charge receiving element of said electroscope.

2. A Roentgen meter, involving: a tubular body structure defining in part an ion chamber; a lens system and scale means incorporated in said body structure; an electroscope disposed in said ion chamber for observation through said lens system and including a charge receiving member; a rotatable band mounted on said body structure and having an outer manually engageable surface to effect rotation and an inner electrostatically chargeable surface; a wiper within said body structure engageable with the inner surface of said band for generating a charge thereon; and an arcuate strip frictionally engageable with said rotatable band and including a tongue movable by said band into and out of engagement with the charge receiving element of said electroscope.

CHARLES C. LAURITSEN.

REFERENCES CITED

The following references are of record in the file of this patent:

UNITED STATES PATENTS

| Number | Name | Date |
|---|---|---|
| 1,855,669 | Glasser et al | Apr. 26, 1932 |
| 2,022,117 | Lauritsen | Nov. 26, 1935 |